No. 758,029. PATENTED APR. 19, 1904.
J. L. BROWN.
TIRE PROTECTOR.
APPLICATION FILED FEB. 6, 1903.
NO MODEL.
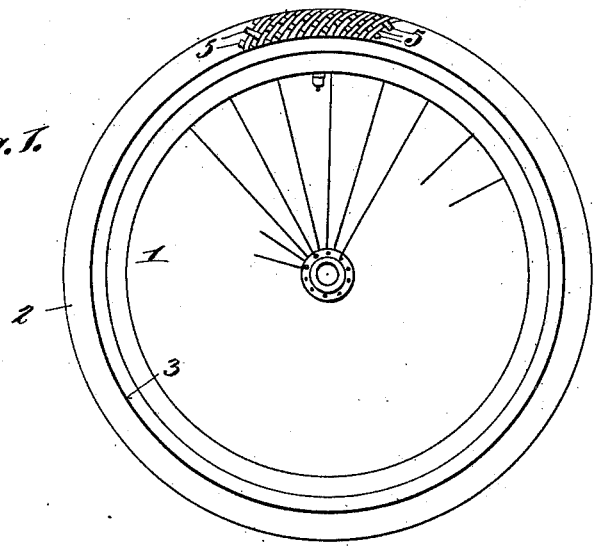
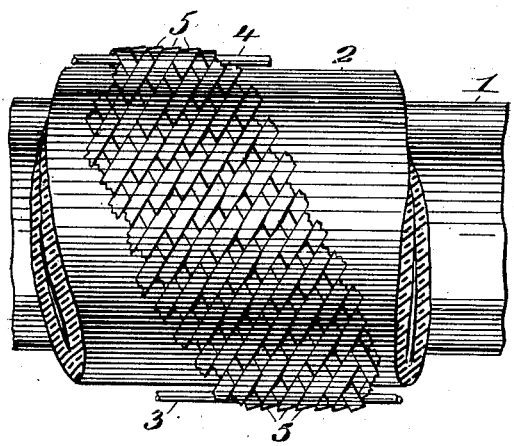
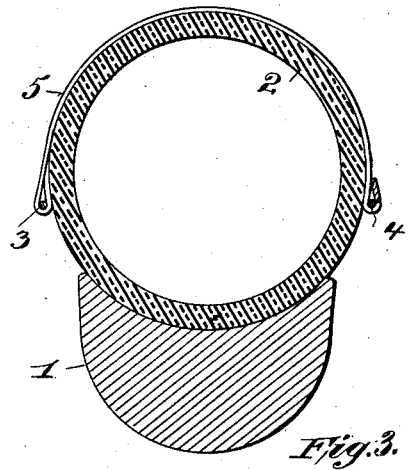
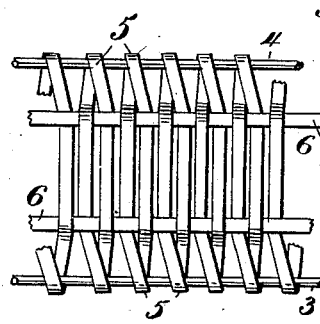
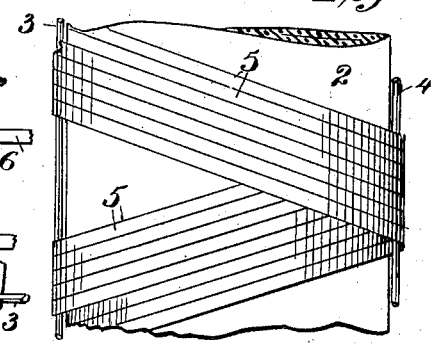
WITNESSES:
INVENTOR
J. L. Brown,
BY
his ATTORNEY No. 758,029.

Patented April 19, 1904.

UNITED STATES PATENT OFFICE.

JACOB L. BROWN, OF RAHWAY, NEW JERSEY, ASSIGNOR OF ONE-HALF TO BENJAMIN KING, OF RAHWAY, NEW JERSEY.

TIRE-PROTECTOR.

SPECIFICATION forming part of Letters Patent No. 758,029, dated April 19, 1904.

Application filed February 6, 1903. Serial No. 142,120. (No model.)

*To all whom it may concern:*

Be it known that I, JACOB L. BROWN, a citizen of the United States, and a resident of Rahway, Union county, New Jersey, have invented certain new and useful Improvements in Tire-Protectors, of which the following is a specification.

The object of my invention is to provide a light, strong, and flexible protector adapted to be placed over the tread of pneumatic tires to protect the same from punctures and other injuries; and said protector comprises a pair of strong rings of less diameter than the corresponding inflated tire and adapted to be placed on opposite sides thereof and flexible metallic strips woven or stretched back and forth between and connected to the rings and adapted to lie over the tread of the tire.

The invention also contemplates the novel details of improvement that will be more fully hereinafter set forth and then pointed out in the claims.

Reference is to be had to the accompanying drawings, forming part hereof, wherein—

Figure 1 is a side view illustrating the application of my invention to a tire. Fig. 2 is an enlarged detail plan view of part thereof. Fig. 3 is a similar view showing a different manner of passing the strips between the rings over the tire. Fig. 4 is a sectional view thereof, showing a cross-strip in edge view, and Fig. 5 is a detail view of part of the protector, showing another manner of connecting the cross-strips with the rings.

Similar numerals of reference indicate corresponding parts in the several views.

In the drawings, 1 indicates the rim, and 2 the tire, of a wheel of suitable construction, and 3 4 indicate rings of less diameter than the diameter of the inflated tire with which they are to be used, and said rings are preferably of less diameter than the diameter between the center line of the tire-tube when it is inflated (see Fig. 2) to assist in keeping the rings from riding up along the sides of the tire. The rings 3 4 may be made of wire or other suitable strong and rigid material, and extending between and connected to the rings are strips 5, of suitable puncture-proof material, preferably flat spring metal, such as steel. The strips 5 are woven, lapped, or interlaced across between the rings 3 4 in curved or concavo-convex form, so as to overlie the tread of the tire.

In Figs. 1 and 2 the strips 5 pass around the rings 3 4 and are interwoven in the form of a flat mesh, the strips respectively extending in diagonal directions between the rings and across the tire. In Figs. 3 and 4 the strips 5 are similarly lapped around the rings 3 4 and are laid diagonally across between the rings and over the tire, but overlying or lapping each other instead of being interwoven. In Fig. 5 the strips 5 extend transversely between the rings 3 4 and are lapped or laid around said rings, as indicated, and in this case also rings or strips 6, preferably flat strips like the cross-strips 5, are interwoven or interlaced with the strips 5 to assist in keeping the strips in proper position. The edges of the strips 5 in all cases should be brought as close together as possible to prevent the passage of tacks, stones, &c., between them.

In making the protector the two rings 3 4 are placed side by side and the strips 5 are woven, interlaced, or laid across between the wires, being carried under the wires at each turn, as indicated, in such manner that the strips 5 will be curved, as indicated in Fig. 4, to receive the outer part of a tire beneath them. The ends of the strips may be fastened in any suitable manner.

When the protector so constructed is to be used, it is placed over a deflated tire and adjusted centrally thereover, and then when the tire is inflated it will expand within the inner curved or concave side of the protector and will press upon the strips 5, and the pressure of the tire will cause the strips to draw strongly against the rings 3 4; but as the pressure is equal in all outward directions the rings will remain in proper position along the sides of the tire and the strips 5 and the rings will be held upon the tire by tension, so as not to slide transversely across the tire. By making the strips 5 of relatively thin flat spring metal they will readily bend inwardly with the tire during use, so as not to materially reduce the resiliency of the tire, and will offer a resistance to tacks, stones, &c., to prevent puncturing or cutting of the tire. By having the strips 5 laid diagonally between the rings 3 4 the tendency of the strips to slide circumferentially along the tread of the tire when meeting with obstacles is resisted, as in such case a more or less longitudinal strain comes upon the strips as distinguished from a direct cross-strain.

Having now described my invention, what I claim is—

1. A tire-protector comprising a pair of rings placed side by side of less diameter than the diameter of the tire and located on the opposite sides of said tire, strips arranged between and sustained by said rings, said strips being so interlaced as to present a solid alternately-overlapping mesh.

2. A tire-protector comprising a pair of rings placed side by side of less diameter than the diameter of the tire and located on opposite sides of said tire, strips connected with said rings and passing over and under said rings and extending across between the rings in concavo-convex form and interlaced between said rings, the interlaced strips having a greater diameter between the rings than the diameter of the rings, whereby the concave surface formed by the strips rests upon the convex surface of the tire.

3. A tire-protector comprising a pair of rings placed side by side of less diameter than the diameter of the tire and located on the opposite sides of said tire, two sets of strips connected with said rings and respectively extending diagonally across between the rings and being interlaced so that the strips of one set will alternately overlap the strips of the other set, as and for the purpose described.

JACOB L. BROWN.

Witnesses:
 LEWIS S. HYER,
 HENRY S. BARNES.